US007776427B2

(12) United States Patent
Ikeda et al.

(10) Patent No.: US 7,776,427 B2

(45) Date of Patent: Aug. 17, 2010

(54) TRANSFER BELT FOR IMAGE FORMING APPARATUS

(75) Inventors: Kazuaki Ikeda, Osaka (JP); Hiroshi Okazaki, Osaka (JP); Masahiro Habuka, Osaka (JP)

(73) Assignee: Sumitomo Electric Fine Polymer, Inc., Osaka (JP)

( * ) Notice: Subject to any disclaimer, the term of this patent is extended or adjusted under 35 U.S.C. 154(b) by 645 days.

(21) Appl. No.: 11/659,240

(22) PCT Filed: Aug. 3, 2005

(86) PCT No.: PCT/JP2005/014174

§ 371 (c)(1), (2), (4) Date: Jul. 6, 2007

(87) PCT Pub. No.: WO2006/013875

PCT Pub. Date: Feb. 9, 2006

(65) Prior Publication Data

US 2007/0292173 A1 Dec. 20, 2007

(30) Foreign Application Priority Data

Aug. 4, 2004 (JP) ............................ 2004-227549
Aug. 4, 2004 (JP) ............................ 2004-227776
Aug. 4, 2004 (JP) ............................ 2004-228012

(51) Int. Cl.
*B32B 25/08* (2006.01)
*B32B 25/14* (2006.01)
*B32B 25/20* (2006.01)
*B32B 27/18* (2006.01)
*G03G 15/16* (2006.01)

(52) U.S. Cl. ....................... 428/212; 428/336; 428/421; 428/422; 428/423.1; 428/447; 428/473.5; 428/474.4; 428/521; 399/297

(58) Field of Classification Search ....................... None
See application file for complete search history.

(56) References Cited

U.S. PATENT DOCUMENTS 6,355,389 B1 * 3/2002 Miyamoto ............... 430/45.32
2004/0013863 A1 1/2004 Terakawa et al.

FOREIGN PATENT DOCUMENTS

JP 2000-010417 A 1/2000

(Continued)

OTHER PUBLICATIONS

Chinese Office Action, with English Translation, issued in Chinese Patent Application No. CN 200580033820.X, issued on Mar. 7, 2008.

(Continued)

*Primary Examiner*—Ramsey Zacharia
(74) *Attorney, Agent, or Firm*—McDermott Will & Emery LLP

(57) ABSTRACT

The invention provides a multi-layered transfer belt for image forming apparatus including a base layer, an elastic layer (intermediate layer) and a surface layer, having a high surface resistivity, an excellent toner releasing property and an excellent non-contaminating property. The transfer belt for image forming apparatus is characterized in including, on the base layer, an elastic layer containing an elastomer and a surface layer formed by a fluorine-containing polymer, and preferably further characterized in that the elastic layer is formed by an elastomer rendered ionic conductive, or in that a binder layer is included between the elastic layer and the surface layer, and that the binder layer is formed by a material having a melting point equal to or lower than a thermal decomposition point of the material constituting the elastic layer and a thermal decomposition point equal to or higher than a melting point of the material constituting the surface layer.

20 Claims, 3 Drawing Sheets

FOREIGN PATENT DOCUMENTS

| | | | |
|---|---|---|---|
| JP | 2002-229345 | A | 8/2002 |
| JP | 2002-278142 | A | 9/2002 |
| JP | 2002-287531 | A | 10/2002 |
| JP | 2003-89125 | A | 3/2003 |
| WO | WO 2004/061531 | A2 | 7/2004 |

OTHER PUBLICATIONS

International Preliminary Report on Patentability and Written Opinion of The International Searching Authority issued in International Application No. PCT/JP2005/014174, dated Feb. 6, 2007.

Japanese Notification of Reasons for Refusal, w/ English translation thereof, issued in Japanese Patent Application No. JP 2004-227776 dated Jul. 14, 2009.

Japanese Notification of Reasons for Refusal, w/ English translation thereof, issued in Japanese Patent Application No. JP 2004-227549 dated Jul. 14, 2009.

* cited by examiner

TRANSFER BELT FOR IMAGE FORMING APPARATUS

RELATED APPLICATIONS

This application is the U.S. National Phase under 35 U.S.C. §371 of International Application No. PCT/JP2005/014174, filed on Aug. 3, 2005, which in turn claims the benefit of Japanese Application Nos. JP 2004-227549, filed on Aug. 4, 2004, JP 2004-227776, filed on Aug. 4, 2004, and JP 2004-228018, filed on Aug. 4, 2004, the disclosures of which Applications are incorporated by reference herein.

TECHNICAL FIELD

The present invention relates to a transfer belt for an image forming apparatus for use in a color image forming apparatus utilizing an electrophotographic process such as a color copying machine or a color laser printer, for transferring a toner image from a photosensitive drum onto a transfer material (paper).

RELATED ART

As an image transfer process in a color image forming apparatus such as a color copying machine or a color laser printer, a process of transferring a toner image, formed on a photosensitive drum, onto a transfer material (paper) by means of a transfer belt for image forming apparatus is becoming utilized as a standard process.

FIG. 7 is a schematic view showing an outline of an intermediate transfer process, which is one of such transfer process. As shown in FIG. 7, a toner image is formed on a photosensitive drum 3, by a toner 1 and a developing roller 2. As this is a 4-drum tandem system, a developing roller and a photosensitive drum are provided corresponding to each of toners of four colors. The toner image, formed on the photosensitive drum 3, is transferred onto a transfer belt 5 for image forming apparatus, by the cooperation of a primary transfer roller 4, the photosensitive drum 3 and the transfer belt 5 for image forming apparatus. A color image, thus formed, is transferred onto a transfer material (paper) 7 by the cooperation of a secondary transfer roller 6, the transfer belt 5 for image forming apparatus and the transfer material (paper) 7, and is fixed by a fixing roller (not shown). The basic principle is similar also in a multiple transfer process.

The transfer belt for image forming apparatus, to be employed in these processes, is desired to have a large resistivity (surface resistivity) in the circumferential direction of the belt, and a resistivity in a thickness direction (volume resistivity) smaller than the surface resistivity, and it is further desired to have properties that such resistivities do not change by a position on the belt, an environment of use or a voltage, that the belt has a high tensile modulus in the circumferential direction, that the belt surface is smooth and has a large contact angle whereby the toner can be easily transferred to the transfer material (paper) from the belt (satisfactory toner releasing property), that it does not chemically contaminate the photosensitive drum or the toner (satisfactory non-contaminating property), and that it is flame retardant.

As it is difficult to satisfy these many properties by a single-layered transfer belt for image forming apparatus, there are proposed multi-layered transfer belts for image forming apparatus, and, for example, JP-A-2002-287531 discloses a transfer belt for image forming apparatus, formed by a base layer of a thermoplastic elastomer of a low resistance and a surface layer of a thermoplastic elastomer of a high resistance, wherein the base layer and the surface layer are formed by heat molding.

Also there is recently desired a transfer belt for image forming apparatus, having elasticity in the thickness direction, and, as a transfer belt for image forming apparatus having such property, there can be conceived a belt having an elastic layer, formed by an elastic member, in addition to the base layer and the surface layer.

In such multi-layered transfer belt for image forming apparatus, the high tensile modulus in the circumferential direction of the belt is achieved by the base layer, while the elasticity in the thickness direction is achieved by the elastic layer. On the other hand, the volume resistivity is stably controlled for example by selecting the materials constituting the base layer and the elastic layer. Also the high surface resistivity, the satisfactory toner releasing property and the satisfactory non-contaminating property are desirably achieved by the surface layer.

However, a transfer belt for image forming apparatus, sufficiently satisfying these properties, has not been obtained in the prior technology.

Patent Reference 1: JP-A-2002-287531 (claim 1)

DISCLOSURE OF THE INVENTION

Problems to be Solved by the Invention

An object of the present invention is to provide a multi-layered transfer belt for image forming apparatus having a base layer, an elastic layer (intermediate layer) and a surface layer, having a large surface resistivity, an excellent toner releasing property and an excellent non-contaminating property. The present inventor has found that this target can be accomplished by forming the surface layer with a fluorine-containing polymer.

Another object of the present invention is to provide a transfer belt for image forming apparatus having the structure and excellent properties described above and further having a stable volume resistivity and the like. The present inventor has found that this object can be accomplished by forming the surface layer by a fluorine-containing polymer and by forming, between the base layer and the surface layer, an elastic layer formed by an elastomer that is rendered ionic conductive.

In the aforementioned invention, the adhesion between the fluorine-containing polymer constituting the surface layer and the elastomer such as urethane constituting the elastic layer is achieved generally by a physical treatment such as a plasma treatment or a blasting, or by a primer treatment, but the former requires excessive work and time thus possibly leading to an elevated cost, while the latter leads to a possibility of a bleeding out of a contaminating substance through the thin surface layer.

Still another object of the present invention is to provide a transfer belt for image forming apparatus having the structure and excellent properties described above, in which an excellent adhesive power is secured between the surface layer and the elastic layer, without requiring excessive work and time and without possibility of bleeding out of the contaminating substance. The present inventor has found that the aforementioned object can be accomplished by providing specified binder layer, between the surface layer formed by the fluorine-containing polymer and the elastic layer formed by the elastomer.

The present invention has been made, based on these findings obtained as a result of intensive investigations.

Means for Solving the Problems

According to a first embodiment of the present invention, there is provided:

a transfer belt for image forming apparatus including:

on a base layer, an elastic layer having an elastomer; and a surface layer formed by a fluorine-containing polymer.

The transfer belt for image forming apparatus, having a surface layer formed by a fluorine-containing polymer, can achieve a high surface resistivity, an excellent toner releasing property and an excellent non-contaminating property. The present invention also provides, as further preferable embodiments, a transfer belt for image forming apparatus of following constitutions.

There is provided: the transfer belt for image forming apparatus according to the first embodiment, wherein the elastic layer is formed by an elastomer that is made ionic conductive (second embodiment). The transfer belt for image forming apparatus of such constitution has excellent characteristics of a stable volume resistivity, in addition to the excellent properties described above.

There is provided: the transfer belt for image forming apparatus according to the first embodiment, further including:

a binder layer between the elastic layer and the surface layer, wherein the binder layer is formed by a material of which a melting point is equal to or lower than a thermal decomposition point of a material constituting the elastic layer and of which a thermal decomposition point is equal to or higher than a melting point of a material constituting the surface layer (third embodiment). The transfer belt for image forming apparatus of this constitution an excellent adhesive power between the surface layer and the elastic layer, without requiring excessive work and time and without possibility of causing a bleeding out of the contaminating substance.

The material forming the surface layer of the transfer belt for image forming apparatus is required to have a large contact angle and a high smoothness, in order to obtain an excellent toner releasing property, and the fluorine-containing polymer constituting the surface layer in the present invention meets such requirement.

In particular, polytetrafluoroethylene (hereinafter abbreviated as PTFE) and tetrafluoroethylene perfluoroalkylvinyl ether (hereinafter abbreviated as PFA) are preferable as these material have a large contact angle whereby a deposited substance such as toner can be peeled off cleanly.

A fourth embodiment of the present invention corresponds to such a preferable embodiment, and there is provided:

the transfer belt for image forming apparatus, wherein the fluorine-containing polymer is PTFE or PFA.

Examples of the fluorine-containing polymer constituting the surface layer include polymers and copolymers of a monomer such as vinylidene fluoride, trifluoroethylene, tetrafluoroethylene, tetrafluoropropylene and hexafluoropropylene. Particularly preferable examples include polymers of monomers including vinylidene fluoride, namely a homopolymer of vinylidene fluoride (polyvinylidene fluoride, hereinafter abbreviated as PVDF) and a copolymer of two or more monomers including vinylidene fluoride. These are rich in flexibility and have an advantage of not liable to hinder the elasticity of the elastic layer.

A fifth embodiment of the present invention corresponds to such a preferable embodiment, and there is provided:

the transfer belt for image forming apparatus, wherein the fluorine-containing polymer is a polymer of monomers including vinylidene fluoride.

Among the polymers of monomers including vinylidene fluoride, PVDF is preferred because of a large contact angle. Also PVDF has a relatively low melting point among the fluorine-containing polymers, and can often be annealed (sintered) at a temperature (about 160° C.) not deteriorating the elastic layer for example formed by urethane (decomposition temperature: about 170° C.), thereby providing an advantage of improving the toner releasing property.

A sixth embodiment of the present invention corresponds to such a preferable embodiment, and there is provided:

the transfer belt for image forming apparatus, wherein the fluorine-containing polymer is PVDF.

Also among the polymers of monomers including vinylidene fluoride, a copolymer of tetrafluoroethylene, hexafluoropropylene and vinylidene fluoride (copolymer being hereinafter abbreviated as THV) has a particularly large contact angle, very little bleeding and a particularly excellent non-contaminating property, and is therefore particularly preferable.

Among the polymers of monomers including vinylidene fluoride, THV, like PVDF, has a relatively low melting point among the fluorine-containing polymers, and can often be annealed (sintered) at a temperature (about 160° C.) not deteriorating the elastic layer for example formed by urethane (decomposition temperature: about 170° C.), thereby providing an advantage of improving the toner releasing property.

A seventh embodiment of the present invention corresponds to such a preferable embodiment, and there is provided:

the transfer belt for image forming apparatus, wherein the fluorine-containing polymer is THV.

In the case that THV or PVDF is employed as the fluorine-containing polymer and that the elastic layer is formed by urethane, the surface layer can be preferably formed easily by spray coating a solution of THV or PVDF onto the elastic layer.

An eighth embodiment of the present invention corresponds to such a preferable embodiment, and there is provided:

the transfer belt for image forming apparatus, wherein the fluorine-containing polymer is THV or PVDF, the elastic layer is formed by urethane, and the surface layer is formed by spray coating a solution of THV or PVDF onto the elastic layer.

The surface layer preferably has a thickness within a range of from 1 to 15 μm. This is same also when the transfer belt for image forming apparatus contains a layer other than the base layer, the elastic layer, the binder layer and the surface layer. Within such range, a sufficient abrasion resistance and a flexibility can be obtained at the same time.

A nineteenth embodiment of the present invention corresponds to such a preferable embodiment, and there is provided:

the transfer belt for image forming apparatus, wherein the surface layer has a thickness of from 1 to 15 μm.

The elastic layer serves to provide flexibility in the thickness direction of the belt. The transfer belt for image forming apparatus of the present invention has a sufficient flexibility in the thickness direction, because of the presence of the elastic layer, formed by an elastomer, between the base layer and the surface layer. Thus, owing to the elasticity that cannot be obtained in the prior single-layered transfer belt for image forming apparatus, obtained is a transfer belt for image forming apparatus capable of carrying the toner without crushing and attaining a higher image quality.

As the elastomer constituting the elastic layer, it is preferably to employ urethane, acrylonitrile-butadiene rubber (NBR), ethylene rubber (EP), silicone rubber (SR), polyamide or two or more kinds of such elastomers.

A ninth embodiment of the present invention corresponds to such a preferable embodiment, and there is provided:

the transfer belt for image forming apparatus, wherein the elastomer is urethane, acrylonitrile-butadiene rubber, ethylene rubber, silicone rubber, polyamide, or two or more kinds thereof.

Among these, urethane is particularly preferable. A tenth embodiment of the present invention corresponds to such a preferable embodiment, and there is provided:

the transfer belt for image forming apparatus, wherein the elastomer is urethane.

Also as the elastomer, the use of an elastomer made ionic conductive (embodiment as described in the second embodiment) is preferable in stably controlling the volume resistivity. The ionic conductivity can be realized for example by dispersing an ionic conductive substance thereby providing a conductivity.

Normally, the entire transfer belt for image forming apparatus preferably has a volume resistivity within a range of from $10^8$ to $10^{14}$ Ω·cm. The volume resistivity of the entire transfer belt for image forming apparatus is a sum of the volume resistivities of the base layer and the elastic layer. It is therefore also possible to control the volume resistivity of the entire transfer belt for image forming apparatus through the control of the volume resistivity of either layer only, by selecting that of either layer considerably larger than that of the other layer, thereby reducing the influence of the volume resistivity of the other layer on the volume resistivity of the entire transfer belt for image forming apparatus.

The preferable ranges of the volume resistivities of the base layer and the elastic layer vary depending on the mode of use of the transfer belt for image forming apparatus. However, as a control of the resistance of the transfer belt for image forming apparatus principally by the base layer tends to cause an unevenness in plane or a dependence on voltage, it is preferable to control the resistance by the elastic layer, and, for this purpose, the resistance of the elastic layer may be made larger than that of the base layer.

An eleventh embodiment of the present invention corresponds to such a preferable embodiment, and there is provided:

the transfer belt for image forming apparatus, wherein the elastic layer has a resistance (Ω) larger than a resistance (Ω) of the base layer.

In view of more stably controlling the resistance of the transfer belt for image forming apparatus and of practical use, the resistance of the elastic layer, represented in Ω, is preferably from 10 to $10^8$ times of the resistance (Ω) of the base layer.

A twenfth embodiment of the present invention corresponds to such a preferable embodiment, and there is provided:

the transfer belt for image forming apparatus, wherein the resistance (Ω) of the elastic layer is from 10 to $10^8$ times of the resistance (Ω) of the base layer.

The elastic layer preferably has a volume resistivity of from $10^8$ to $10^{14}$ Ω·cm in consideration of toner transfer.

A thirteenth embodiment of the present invention corresponds to such a preferable embodiment, and there is provided:

the transfer belt for image forming apparatus, wherein the elastic layer has a volume resistivity of from $10^8$ to $10^{14}$ Ω·cm.

The thickness of the elastic layer, in view of providing the transfer belt for image forming apparatus with a suitable elasticity (flexibility) in the thickness direction, is preferably within a range of from 50 to 300 μm and particularly preferably within a range of from 100 to 250 μm.

In the transfer belt for image forming apparatus of the present invention, the base layer is formed by a material of a high elastic modulus, and provides the transfer belt for image forming apparatus with a high tensile elastic modulus. Preferred is a material having an elastic modulus of 1 GPa or higher, more preferably a material having an elastic modulus within a range of from 1 to 10 GPa. Also the volume resistivity of the transfer belt for image forming apparatus can also be controlled by the material of the base layer.

Examples of the material of high elastic modulus constituting the base layer include polyimide (PI), polyamidimide (PAI) and PVDF.

A fourteenth embodiment of the present invention corresponds to such a preferable embodiment, and there is provided:

the transfer belt for image forming apparatus, wherein the base layer is formed by polyimide (PI), polyamidimide (PAI) or PVDF.

The base layer formed for example by polyimide (PI), polyamidimide (PAI) or PVDF can be controlled in the volume resistivity thereof by adding a conductive material such as carbon black (acetylene black). Polyimide (PI) made conductive with carbon, polyamidimide (PAI) made conductive with carbon, or PVDF made conductive with carbon is preferable because of a high electric modulus.

The thickness of the base layer, in view of providing the transfer belt for image forming apparatus with a high tensile elastic modulus in the circumferential direction of the transfer belt for image forming apparatus, is preferably within a range of from 30 to 100 μm, particularly preferably within a range of from 40 to 80 μm.

The base layer provides the transfer belt for image forming apparatus with a tensile elastic modulus in the circumferential direction thereof, and the elastic layer provides the elastic modulus in the laminating direction. Also an excessively lowered resistance of the base layer has to be avoided, since the current does not flow in the laminating direction but in the circumferential direction. The thickness of the base layer and the thickness of the elastic layer are preferably in an appropriate relationship, and the thickness of the elastic layer is preferably from 1 to 10 times of the thickness of the base layer, particularly preferably from 2 to 4 times.

A fifteenth embodiment of the present invention corresponds to such a preferable embodiment, and there is provided:

the transfer belt for image forming apparatus, wherein a thickness of the elastic layer is from 1 to 10 times of a thickness of the base layer.

The transfer belt for image forming apparatus of the present invention preferably includes a binder layer between the surface layer and the elastic layer. It is particularly preferable, as described above, that the binder layer has a melting point equal to or lower than a thermal decomposition point of the material constituting the elastic layer, and a thermal decomposition point equal to or higher than a melting point of the material constituting the surface layer (embodiment of the third embodiment).

Since the binder layer has the melting point equal to or lower than the thermal decomposition point of the material constituting the elastic layer, the binder layer and the elastic layer can be adhered firmly pressurization under heating at a temperature equal to or higher than the melting points of the binder layer and the elastic layer and equal to or lower than the thermal decomposition points of the binder layer and the elastic layer.

Also as the binder layer is constituted of a material having a thermal decomposition point equal to or higher than the melting point of the material constituting the surface layer, both layers can be melt adhered by heating at a temperature equal to or higher than the melting of the surface layer and equal to or lower than the thermal decomposition point of the binder layer.

Presence of such binder layer allows to adhere the fluorine-containing polymer constituting the surface layer and the elastomer constituting the elastic layer such as urethane, without requiring excessive work and time. Also such binder layer, not containing a substance contaminating the surface layer such as a primer, does not cause a problem of bleeding out of a contaminating substance through the thin surface layer.

A material constituting the binder layer is preferably soluble in a solvent. Thus the adhesion can be achieved merely by dissolving the material, constituting the binder layer, in a solvent and coating the material on the surface layer by a spraying method or a dipping method.

A sixteenth embodiment of the present invention corresponds to such a preferable embodiment, and there is provided:

the transfer belt for image forming apparatus, wherein the material constituting the binder layer is a material soluble in a solvent.

The binder layer is preferably constituted of a fluorine-containing polymer, and particularly preferably of THV, because it is easily adherable with PTFE or PFA owing to presence of a tetrafluoro component, is available in a grade having a melting point as low as 110° C., has a decomposition point as high as 400° C. (equal to or higher than the melting point of PTFE), has an excellent adherability with urethane or the like, and is flexible. Particularly preferable is a case where the binder layer is formed by THV, and the surface layer is formed by PTFE or PFA.

A seventeenth embodiment of the present invention corresponds to such a preferable embodiment, and there is provided:

the transfer belt for image forming apparatus, wherein the binder layer is constituted of THV.

As described above, the fluorine-containing polymer, employed as the surface layer of the transfer belt for image forming apparatus of the invention has an excellent toner releasing property. In the case of utilizing such fluorine-containing polymer in the surface layer, the binder layer may also be formed by a fluorine-containing polymer to achieve a sufficiently firm adhesion of both layers. The adhesive power of both layers can be further increased by adding a fluorine-containing polymer, same as that constituting the surface layer, in the polymer of the binder layer. Such method allows to achieve adhesion with the surface layer, even when the binder layer is not formed by the fluorine-containing polymer.

The fluorine-containing polymer to be contained in the binder layer is preferably contained, in a state of a powdered substance, in the material constituting the binder layer. In such case, the powdered substance preferably has a particle size within a range of from 0.01 to 10 μm. This is because a powdered substance of a particle size less than 0.01 μm is difficult to manufacture, while a particle size exceeding 10 μm is liable to cause a deposition and to deteriorate the surface roughness.

The fluorine-containing polymer to be contained in the binder layer, when used in an excessively small amount, cannot provide a sufficient effect of improving the adhesive power, and, when used in an excessively large amount, causes a large influence on the characteristics of THV or the like, principally constituting the binder layer. In consideration of such situation, the preferable amount of the fluorine-containing polymer to be contained in the binder layer is from 1 to 300 parts with respect to 100 parts of the material constituting the binder layer. Particularly in the case that the surface layer is constituted of PFA and the binder layer is constituted of THV, PFA is preferably contained in an amount of from 10 to 100 parts in THV.

An eighteenth embodiment of the present invention corresponds to such a preferable embodiment, and there is provided:

the transfer belt for image forming apparatus, wherein the binder layer contains a fluorine-containing polymer used for constituting the surface layer.

The binder layer, when formed with a larger thickness, shows an increase in the volume resistivity, and, when formed with a smaller thickness, shows a decrease in the adhesive power. Based on these points, the thickness is preferably from 0.1 to 10 μm.

A twentieth embodiment of the present invention corresponds to such a preferable embodiment, and there is provided:

the transfer belt for image forming apparatus, wherein the binder layer has a thickness of from 0.1 to 10 μm.

The present invention is not limited to a transfer belt for image forming apparatus formed solely of a base layer, an elastic layer, a binder layer and a surface layer, but also includes structures containing other layers not specified in the present description, between the base layer and the elastic layer, between the elastic layer and the binder layer, and between the binder layer and the surface layer, within an extent not hindering the objects of the present invention.

The transfer belt of the present invention is adapted for use in an image forming apparatus, and has a function of transferring a toner image, formed for example on a photosensitive drum, onto a transfer material such as paper. The image forming apparatus may be a copying machine or a laser beam printer utilizing an electrophotographic process, but is not limited to these examples and includes all the apparatuses in which a toner image is formed and is transferred onto a transfer material thereby forming an image on the transfer material.

The transfer belt for image forming apparatus of the present invention includes a transfer-fixing belt for an image forming apparatus for executing transfer and fixation at the same time, and, in view of the efficiency, it is preferable to apply the present invention to such transfer belt for image forming apparatus.

A twenty first embodiment of the present invention corresponds to such a preferable embodiment, and there is provided:

the transfer belt for image forming apparatus, wherein the transfer belt for image forming apparatus is a transfer-fixing belt for an image forming apparatus.

Effect of the Invention

The transfer belt for image forming apparatus of the present invention, utilizing the surface layer formed by the fluorine-containing polymer, can achieve a high surface resistivity, an excellent toner releasing property and an excellent non-contaminating property.

Recently, toners are being actively developed for meeting the trend of image forming apparatuses toward color capability and higher image quality, but such toners are often insufficient in releasing property and contamination resistance, and prior single-layered transfer belts for image forming apparatus formed by polyimide or polyamidimide or multi-layered formed by spray coating urethane or silicone are unable to sufficiently match these toners. However, the present invention enables to obtain a transfer belt for image forming apparatus capable of satisfactorily match these toners.

In particular, as the fluorine-containing polymer, specified one such as PTFE or PFA provides particularly excellent characteristics in the surface resistivity, toner releasing property and non-contaminating property.

Also as the fluorine-containing polymer, specified one such as PVDF or THV provides excellent characteristics in the surface resistivity, toner releasing property and non-contaminating property and also provides an advantage of facilitating a work for further improving the properties of the transfer belt for image forming apparatus.

Also polyamide, polyamidimide or PVDF used in the base layer allows to obtain a transfer belt for image forming apparatus having a high tensile strength in the circumferential direction.

Also the transfer belt for image forming apparatus of the invention has a sufficient flexibility in the thickness direction, as it is provided with an elastic layer, formed by an elastomer, between the base layer and the surface layer.

Also the volume resistivity can be controlled more stably in case of employing an elastomer, rendered ionic conductive, as the elastomer constituting the elastic layer (embodiment of claim 2).

Also in the case that the elastic layer has a resistance larger than that of the base layer, the transfer belt for image forming apparatus can be controlled at a stable resistance by the elastic layer only.

Furthermore, in the case that a binder layer is provided between the elastic layer and the surface layer, by a material of which a melting point is equal to or lower than a thermal decomposition point of the material constituting the elastic layer and of which a thermal decomposition point is equal to or higher than a melting point of the material constituting the surface layer, the surface layer and the elastic layer can be adhered without requiring excessive work and time. Also the binder layer, not containing a substance contaminating the surface layer such as a primer, does not cause a problem of bleeding out of a contaminating substance through the thin surface layer.

DESCRIPTION OF SYMBOLS

Figure 1:
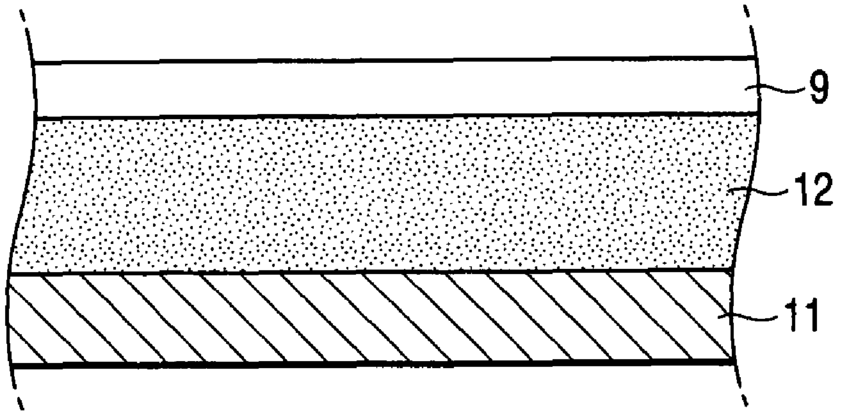
FIG. 1 is a cross-sectional view showing an example of the transfer belt for image forming apparatus of the present invention.

1 toner
2 developing roller
3 photosensitive drum
4 primary transfer roller
5 transfer belt for image forming apparatus
6 secondary transfer roller
7 transfer material
8 external tube
9 surface layer
10 drum-shaped mold
11 base layer
12 elastic layer
13 internal core
14 binder layer

BEST MODE FOR CARRYING OUT THE INVENTION

FIG. 1 is a cross-sectional view showing an example of the transfer belt for image forming apparatus of the present invention. The transfer belt for image forming apparatus shown in FIG. 1 includes a surface layer 9 and a base layer 11, and also an elastic layer 12 between the surface layer 9 and the base layer 11. The surface layer 9 is formed by PTFE, and thus providing an excellent toner releasing property.

The base layer 11 is formed by polyimide having an elastic modulus within a range of from 1 to 10 GPa, and a thickness within a range of from 40 to 80 μm. As a result, it provides the composite member with a high tensile elastic modulus in the circumferential direction of the transfer belt for image forming apparatus.

The elastic layer 12 is formed by aqueous urethane. The elastic layer 12 has a thickness within a range of from 100 to 250 μm, and, as a result, provides the transfer belt for image forming apparatus with an appropriate flexibility in the thickness direction.

The elastic layer 12 has a volume resistivity within a range of from $10^8$ to $10^{14}$ Ω·cm. The volume resistivity of the elastic layer 12 is 10 times or more of the volume resistivity of the base layer 11, so that the volume resistivity of the entire transfer belt for image forming apparatus is approximately within the range of from $10^8$ to $10^{14}$ Ω·cm.

Examples are shown in the following, but the scope of the present invention is not limited to the following examples. Following examples are subject to various modifications within the extent identical with or equivalent to the present invention.

EXAMPLE 1

While a drum-shaped mold is rotated, a polyimide varnish is coated on the outer surface thereof, and then the mold is heated to execute an imidation reaction, thereby obtaining a polyimide layer (base layer) of a thickness of 60 μm, covering the periphery of the mold. Then aqueous urethane, adjusted to a viscosity of about 10 Pa·s by the addition of a viscosifier and subjected to a bubble removing, is coated on the polyimide layer by a dipping method. After the coating, it is dried at the normal temperature to remove the water, and is annealed at 160° C. to obtain an urethane layer (elastic layer) of a thickness of 200 μm on the polyimide layer.

Then, on the urethane layer, a THV solution is spray coated under such conditions as to obtain a thickness of 5 μm after drying and annealing. Then it is dried and annealed at 160° C. to form a surface layer, thereby obtaining a transfer belt of the present invention.

EXAMPLE 2

Figure 2:
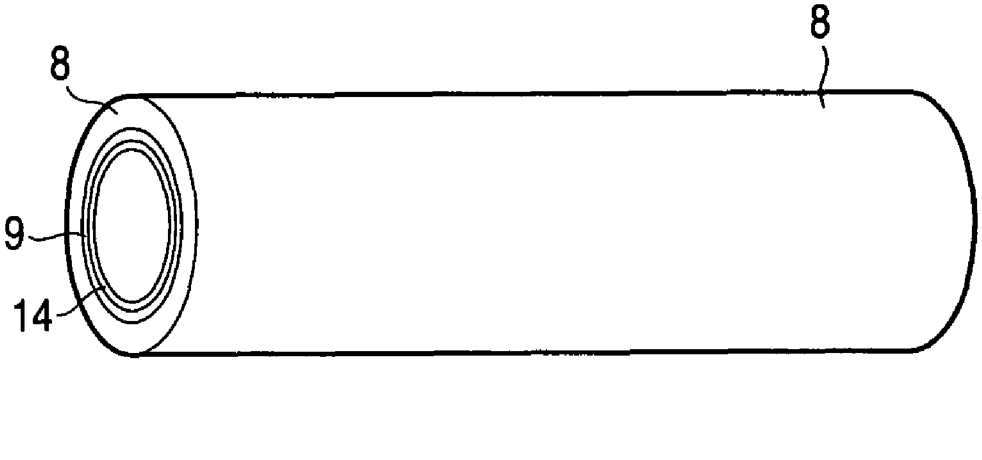
FIG. 2 is a view showing an example of a producing method for the transfer belt for image forming apparatus of the invention.

At first, as shown in FIG. 2, on an internal surface of a steel external tube 8 having a thermal expansion coefficient of $1.76\times10^{-5}$/° C. and having a mirror-finished internal surface, a dispersion of PTFE (melting point 327° C., thermal decomposition point 400° C.) is coated by a dipping method and sintered at 380° C. to obtain a surface layer 9.

Then THV (melting point: 120° C., thermal decomposition point: 400° C.) is dissolved in butyl acetate, and formed into a film by a dipping method on the surface layer 9, and dried to obtain a binder layer 14. Then the binder layer 14 is heated at 350° C., higher than the melting points of PTFE and THV, thereby being adhered to the surface layer 9.

Figure 3:
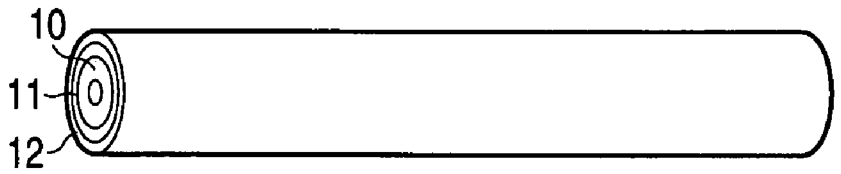
FIG. 3 is a view showing an example of a producing method for the transfer belt for image forming apparatus of the invention.

Then, polyimide, subjected to a conductive carbon treatment for adjusting the volume resistivity, is formed into a film on the surface of the drum-shaped mold 10 as shown in FIG. 3, and sintered at 380° C. to obtain a base layer 11.

Then, on the base layer 11, aqueous urethane (melting point: 120° C., thermal decomposition point: 180° C.) is coated by a dipping method and dried to obtain an elastic layer 12.

Figure 4:
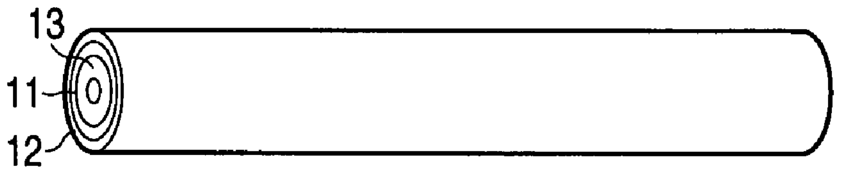
FIG. 4 is a view showing an example of a producing method for the transfer belt for image forming apparatus of the invention.

Then a composite member of the base layer 11 and the elastic layer 12, formed on the surface of the drum-shaped mold 10, is peeled off from the drum-shaped mold 10, and the composite member formed in a cylindrical shape is fitted, as shown in FIG. 4, on the external periphery of an internal core 13 of MC nylon, having a thermal expansion coefficient of $8.0\times10^{-5}$/° C.

Figure 5:
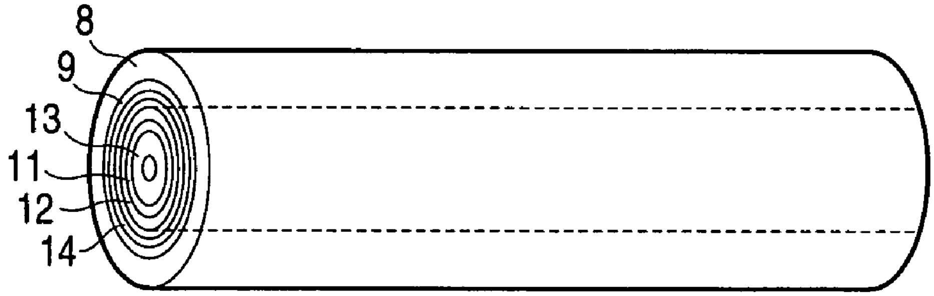
FIG. 5 is a view showing an example of a producing method for the transfer belt for image forming apparatus of the invention.
Figure 6:
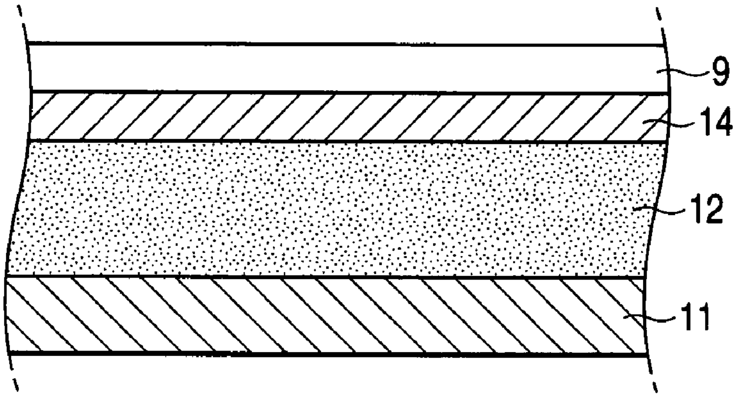
FIG. 6 is a cross-sectional view showing an example of the transfer belt for image forming apparatus of the present invention.
Figure 7:
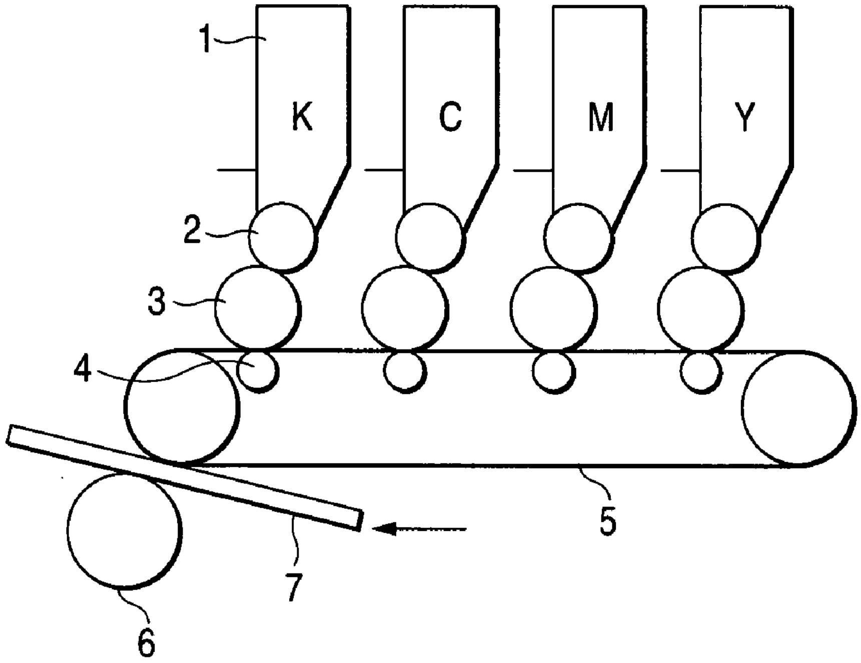
FIG. 7 is a schematic view showing an image transfer process utilizing the transfer belt for image forming apparatus.

Then, as shown in FIG. 5, the internal core 13, on which the composite member of the base layer 11 and the elastic layer 12 is fitted, is inserted into the external tube 8 provided, on the internal surface thereof, with the composite layer of the binder layer 14 and the surface layer 9, and is heated to 150° C. in vacuum. Under such heating, as the external tube 8 and the internal core 13 have a difference in the thermal expansion coefficient, the thermally expanded internal core 13 pressurized the internal surface of the external tube 8, whereby obtained is a composite member of 4-layered structure, formed by the composite layer of the base layer 11 and the elastic layer 12, and the composite layer of the binder layer 14 and the surface layer 9. FIG. 6 is a cross-sectional view of the composite member.

Then the internal core 13 and the external tube 8 are cooled, and the composite member of 4-layered structure is separated therefrom to obtain a transfer belt for image forming apparatus.

The transfer belt for image forming apparatus thus obtained included, on the base layer (polyimide) of a thickness of 60 μm, an elastic layer (urethane) of a thickness of 200 μm, a binder layer (THV) of a thickness of 1 μm, and a surface layer (PTFE) of a thickness of 5 μm, excellent in the surface resistivity, the toner releasing property and the non-contaminating property.

The THV in the binder layer in the present example has a melting point of 120° C. while the PTFE in the surface layer has a melting point of 327° C. It is therefore difficult to sinter the surface layer in a process of forming the elastic layer, the binder layer and the surface layer in succession on the base layer by a spraying method. However, the above-described producing method, namely the method of pressurizing the internal surface of the external tube 8 by the internal core 13 enabled secure adhesion of the elastic layer and the binder layer.

In the above-described example, for obtaining the composite member of the composite layer of the base layer 11 and the elastic layer 12 and the composite layer of the binder layer 14 and the surface layer 9 by pressurizing the internal surface of the external tube 8 by the internal core 13, there is utilized a difference in the thermal expansion coefficient between the internal core 13 and the external tube 8, but another method such as a method of utilizing an air pressure or a method of utilizing an instantaneous explosive power may be utilized for pressurizing the composite member of the base layer 11 and the elastic layer 12 toward the composite layer of the binder layer 14 and the surface layer 9, in order to obtain the transfer belt for image forming apparatus.

EXAMPLE 3

A process is conducted in the same manner as in Example 2, except for changing the THV amount dissolved in butyl acetate to change the thickness of the binder layer 14 and changing the aqueous urethane, coated on the base layer 11, to one subjected to an ionic conductive treatment, to obtain a transfer belt for image forming apparatus including, on the base layer (polyimide) of a thickness of 60 μm, an elastic layer (urethane) of a thickness of 200 μm, a binder layer (THV) of a thickness of 3 μm, and a surface layer (PTFE) of a thickness of 5 μm. The ionic conductive treatment is executed by dispersing an ionic conductive agent in the aqueous urethane, and the volume resistivity is so regulated as to be 10 times of the volume resistivity of the base layer 11.

The transfer belt for image forming apparatus thus obtained is excellent in the surface resistivity, the toner releasing property and the non-contaminating property. Also the volume resistivity of the transfer belt for image forming apparatus is controlled in stable manner by the elastic layer 12. Also firm adhesion is attained between the surface layer and the binder layer, and between the binder layer and the elastic layer, and no bleeding is observed.

EXAMPLE 4

A process is conducted in the same manner as in Example 2, except for employing, as the PTFE dispersion for forming the surface layer 9, one in which conductive zinc oxide (ZnO) is dispersed, and changing the aqueous urethane, coated on the base layer 11, to one subjected to an ionic conductive treatment, to obtain a transfer belt for image forming apparatus including, on the base layer (polyimide) of a thickness of 60 μm, an elastic layer (urethane) of a thickness of 200 μm, a binder layer (THV) of a thickness of 1 μm, and a surface layer (PTFE) of a thickness of 5 μm.

The ionic conductive treatment is executed by dispersing an ionic conductive agent in the aqueous urethane, in such a manner that the volume resistivity became $10^9$ Ω·cm. The surface layer 9 had a volume resistivity of $10^{11}$ Ω·cm, the binder layer 14 had a volume resistivity of $10^{10}$ Ω·cm, and polyimide constituting the base layer 11 is regulated to a volume resistivity of $10^8$ Ω·cm by a carbon conductive treatment.

The transfer belt for image forming apparatus thus obtained is excellent in the surface resistivity, the toner releasing property and the non-contaminating property. Also the volume resistivity of the transfer belt for image forming apparatus is controlled in stable manner by the elastic layer 12.

EXAMPLE 5

As shown in FIG. 2, on an internal surface of a steel external tube 8 having a thermal expansion coefficient of $1.76\times10^{-5}$/° C. and having a mirror-finished internal surface, PFA (350J dispersion, particle size 0.2 μm, manufactured by du Pont de Nemours & Co.) (melting point 295° C.) is coated by a dipping method and sintered at 380° C. to obtain a surface layer 9.

Then THV (THV220, manufactured by Sumitomo 3M Co.) (melting point: 120° C., thermal decomposition point: 400° C.) is dissolved in butyl acetate, and formed into a film by a dipping method on the surface layer 9, and dried to obtain a binder layer 14. Then the binder layer 14 is heated at 350° C., higher than the melting points of PFA and THV, thereby being adhered to the surface layer 9. Process is executed in otherwise same manner as in the Example 3 to obtain a transfer belt for image forming apparatus.

The transfer belt for image forming apparatus thus obtained included, on the base layer (polyimide) of a thickness of 60 μm, an elastic layer (urethane rendered ionic conductive) of a thickness of 200 μm, a binder layer (THV) of a thickness of 3 μm, and a surface layer (PFA) of a thickness of 5 μm, and there could be obtained a transfer belt for image forming apparatus excellent in the surface resistivity, the toner releasing property and the non-contaminating property.

In the transfer belt for image forming apparatus, the volume resistivity is stably controlled by the elastic layer 12. Also firm adhesion is attained between the surface layer and the binder layer and between the binder layer and the elastic layer, and no bleeding is observed.

As THV in the binder layer has a melting point of 120° C. while PFA in the surface layer has a melting point of 295° C., it is difficult to sinter the surface layer in a process of forming the elastic layer, the binder layer and the surface layer in succession on the base layer for example by a spraying method, but the above-described producing method realized a firm adhesion between the elastic layer and the binder layer.

EXAMPLE 6

For forming the binder layer, powdered PFA (340J, particle size 0.2 μm, manufactured by du Pont de Nemours & Co.), used for forming the surface layer, is in advance added to the THV (THV220, manufactured by Sumitomo 3M Co.) in an amount of 60 parts with respect to 100 parts of THV, and THV is dissolved in butyl acetate. Process is executed in the otherwise same manner as in Example 5 to obtain a transfer belt for image forming apparatus.

The transfer belt for image forming apparatus thus obtained included, on the base layer (polyimide) of a thickness of 60 μm, an elastic layer (urethane rendered ionic conductive) of a thickness of 200 μm, a binder layer (THV) of a thickness of 3 μm, and a surface layer (PFA) of a thickness of 5 μm, and there could be obtained a transfer belt for image forming apparatus excellent in the surface resistivity, the toner releasing property and the non-contaminating property.

Then, on the transfer belt for image forming apparatus obtained in Example 3, 5 or 6, an adhesive power between the surface layer and the binder layer is measured. The measurement is conducted in the following manner. In a measuring position prepared by forming a notch of a width of 1 cm in the surface layer and the binder layer, a force required for peeling off both layers is measured as an adhesive power.

As a result of measurement, Examples 3 and 5 provided an adhesive power of 0.06 kg/cm, while Example 6 provided an adhesive power of 0.35 kg/cm. Based on these results, it is confirmed that the adhesive power between the surface layer and the binder layer could be improved when the binder layer contained the fluorine-containing polymer constituting the surface layer.

The invention claimed is:

1. A transfer belt for image forming apparatus, comprising: on a base layer, an elastic layer having an elastomer;

a surface layer formed by a fluorine-containing polymer; and a binder layer between the elastic layer and the surface layer, wherein the binder layer is formed by a material of which a melting point is equal to or lower than a thermal decomposition point of a material constituting the elastic layer and of which a thermal decomposition point is equal to or higher than a melting point of a material constituting the surface layer.

2. The transfer belt for image forming apparatus according to claim 1, wherein the elastic layer is formed by an elastomer that is made ionic conductive.

3. The transfer belt for image forming apparatus according to claim 1, wherein the fluorine-containing polymer is polytetrafluoroethylene (PTFE) or tetrafluoroethylene perfluoroalkylvinyl ether (PFA).

4. The transfer belt for image forming apparatus according to claim 1, wherein the fluorine-containing polymer is a polymer of monomers including vinylidene fluoride.

5. The transfer belt for image forming apparatus according to claim 4, wherein the fluorine-containing polymer is polyvinylidene fluoride (PVDF).

6. The transfer belt for image forming apparatus according to claim 4, wherein the fluorine-containing polymer is a copolymer of tetrafluoroethylene, hexafluoropropylene and vinylidene fluoride (THV).

7. The transfer belt for image forming apparatus according to claim 4, wherein the fluorine-containing polymer is a copolymer of tetrafluoroethylene, hexafluoropropylene and vinylidene fluoride (THV) or polyvinylidene fluoride (PVDF), the elastic layer is formed by urethane, and the surface layer is formed by spray coating a solution of THV or PVDF onto the elastic layer.

8. The transfer belt for image forming apparatus according to claim 1, wherein the elastomer is urethane, acrylonitrile-butadiene rubber, ethylene rubber, silicone rubber, polyamide, or two or more kinds thereof.

9. The transfer belt for image forming apparatus according to claim 8, wherein the elastomer is urethane.

10. The transfer belt for image forming apparatus according to claim 1, wherein the elastic layer has a resistance (Ω) larger than a resistance (Ω) of the base layer.

11. The transfer belt for image forming apparatus according to claim 10, wherein the resistance (Ω) of the elastic layer is from 10 to $10^8$ times of the resistance (Ω) of the base layer.

12. The transfer belt for image forming apparatus according to claim 1, wherein the elastic layer has a volume resistivity of from $10^8$ to $10^{14}$ Ω·cm.

13. The transfer belt for image forming apparatus according to claim 1, wherein the base layer is formed by polyimide (PI), polyamidimide (PAI) or polyvinylidene fluoride (PVDF).

14. The transfer belt for image forming apparatus according to claim 1, wherein a thickness of the elastic layer is from 1 to 10 times of a thickness of the base layer.

15. The transfer belt for image forming apparatus according to claim 1, wherein the material constituting the binder layer is a material soluble in a solvent.

16. The transfer belt for image forming apparatus according to claim 1, wherein the binder layer is formed by a copolymer of tetrafluoroethylene, hexafluoropropylene and vinylidene fluoride (THV).

17. The transfer belt for image forming apparatus according to claim 1, wherein the binder layer contains a fluorine-containing polymer used for constituting the surface layer.

18. The transfer belt for image forming apparatus according to claim 1, wherein the surface layer has a thickness of from 1 to 15 μm.

19. The transfer belt for image forming apparatus according to claim 1, wherein the binder layer has a thickness of from 0.1 to 10 μm.

20. The transfer belt for image forming apparatus according to claim 1, wherein the transfer belt for image forming apparatus is a transfer-fixing belt for an image forming apparatus.

* * * * *